United States Patent
Duda et al.

(10) Patent No.: US 12,158,135 B2
(45) Date of Patent: Dec. 3, 2024

(54) BLOCK FOR GEOTECHNICAL APPLICATIONS

(71) Applicants: Rzeszów University of Technology, Rzeszów (PL); Adamcio Andrzej Przedsibiorstwo Wielobranżowe ANMET, Szprotawa (PL)

(72) Inventors: Aleksander Duda, Rzeszów (PL); Mateusz Rajchel, Rzeszów (PL); Andrzej Adamcio, Szprotawa (PL); Anna Wilczyńska, Szprotawa (PL); Wojciech Wilczyński, Szprotawa (PL); Tomasz Siwowski, Rzeszów (PL)

(*) Notice: Subject to any disclaimer, the term of this patent is extended or adjusted under 35 U.S.C. 154(b) by 588 days.

(21) Appl. No.: 17/389,441

(22) Filed: Jul. 30, 2021

(65) Prior Publication Data

US 2022/0065221 A1     Mar. 3, 2022

(51) Int. Cl.
*E04B 5/04*     (2006.01)
*E02D 17/18*     (2006.01)
(Continued)

(52) U.S. Cl.
CPC .............. *F03D 80/00* (2016.05); *E02D 17/18* (2013.01); *E02D 17/205* (2013.01);
(Continued)

(58) Field of Classification Search
CPC ...... F03D 80/00; Y02W 30/50; E02D 17/205; E01C 3/003
See application file for complete search history.

(56) References Cited

U.S. PATENT DOCUMENTS

| | | | | |
|---|---|---|---|---|
| 4,169,339 A | * | 10/1979 | See ........................ | E02D 17/205 428/53 |
| 5,021,205 A | * | 6/1991 | Niioka ..................... | B28B 3/022 264/85 |

(Continued)

FOREIGN PATENT DOCUMENTS

| | | |
|---|---|---|
| CN | 206941512 U | 1/2018 |
| JP | 200220165 A | 8/2003 |

OTHER PUBLICATIONS

CN206941512 (U) Machine Translation into English Language.
JP200220165A Machine Translation into English Language.

*Primary Examiner* — Basil S Katcheves
(74) *Attorney, Agent, or Firm* — BelayIP (57) ABSTRACT

A block for geotechnical applications is disclosed, the block having a composite body which is a section of a used wind turbine blade including a part of its leading edge, trailing edge and the windward surface and leeward surface of the used blade. The body is open from above and below. Fragments of the windward surface, leeward surface, leading edge and trailing edge of the used blade are the block's side walls. The inside of the body is filled with a filling material. A method of making a block for geotechnical applications is also disclosed. Under the method, a section is marked on a used wind turbine blade between its tip and root for mounting in a hub. Then, within this section, the block body is cut out, in two cutting planes parallel to each other, in the form of a fragment with a closed cross section, including a part of a leading edge, trailing edge, windward shell and leeward shell of this blade, then this body is filled with a filling material, making its filling.

6 Claims, 5 Drawing Sheets

(51) Int. Cl.
*E02D 17/20* (2006.01)
*F03D 80/00* (2016.01)
*B29L 31/08* (2006.01)

(52) U.S. Cl.
CPC ..... *B29L 2031/085* (2013.01); *F05B 2230/60* (2013.01); *F05B 2240/302* (2013.01); *F05B 2280/6003* (2013.01); *Y02W 30/50* (2015.05); *Y10T 29/49755* (2015.01)

(56) References Cited

U.S. PATENT DOCUMENTS

| | | | | |
|---|---|---|---|---|
| 5,222,342 | A * | 6/1993 | Defferrari | E02B 3/14 |
| | | | | 52/604 |
| 5,484,235 | A * | 1/1996 | Hilfiker | E02D 17/205 |
| | | | | 405/262 |
| 5,911,539 | A * | 6/1999 | Egan | E02D 29/0225 |
| | | | | 405/20 |
| 6,146,054 | A * | 11/2000 | Tessonneau | E01C 3/006 |
| | | | | 404/31 |
| 6,280,121 | B1 | 8/2001 | Khamis | |
| 8,777,514 | B2 | 7/2014 | Heselden | |
| 11,434,616 | B1 * | 9/2022 | Anderson | E02D 17/205 |
| 2019/0066062 | A1 * | 2/2019 | Lilly | G06Q 10/00 |
| 2019/0070680 | A1 * | 3/2019 | Lilly | B23D 57/0092 |
| 2020/0061725 | A1 * | 2/2020 | Lilly | B23D 57/0053 |

* cited by examiner

BLOCK FOR GEOTECHNICAL APPLICATIONS

CROSS REFERENCE TO RELATED APPLICATIONS

This application claims priority to earlier filed Polish patent application Ser. No. P.435138, filed on August 20, the content of which is herein incorporated by reference.

BACKGROUND OF THE INVENTION

An object of the invention is a block for geotechnical applications, a method of making a block for geotechnical applications and a method of making a structure using a block for geotechnical applications. The solutions are used especially for making retaining structures, reinforcing the ground and making road base courses and railway track beds.

Despite the fact that most used parts of wind turbines are now recycled, there is still a problem with the recycling of composite blades of wind turbines, which are generally landfilled and have a decomposition time of several hundred years. Recycling of the blades is made by grinding, which is expensive and requires a high energy input. The ground blades are used as an additive to an alternative fuel burned in cement plants.

Numerous solutions of blocks, gabions, prefabricated elements for geotechnical applications are known from the state of the art. These solutions are based on newly produced elements made of concrete—blocks, steel—gabions, wood—cribs, or synthetics—geonets, geotextiles, geogrids; or polystyrene—blocks.

For example, a retaining wall is known from the publication of the US patent description U.S. Pat. No. 6,280,121 B1, which comprises precast concrete blocks connected, by means of connectors, with reinforcement elements. The concrete blocks are arranged in horizontal rows stacked one on top of another, the first row rests upon the foundation. Openings in said blocks in one row coincide with openings in the blocks in rows vertically adjacent. The openings are filled with poured concrete, which after drying and setting provides reinforcement for the wall.

A wall assembly is known from the American patent description U.S. Pat. No. 9,714,510 B2, which includes preformed building blocks and a trellis type support member for maintaining the building blocks in place in the desired orientation. The individual blocks are connected to the supporting trellis for added stability.

A revetment brick is known from the description of the Chinese utility model CN 206941512 U. The horizontal cross-section of brick body is in isosceles right triangle.

A gabion for use in protecting military or civil installations from weapons assault or from elemental forces, such as flood waters, lava flows, avalanches, soil instability, slope erosion and the like, is known from the US patent description U.S. Pat. No. 8,777,514 B2. The gabion comprises opposed side walls comprising a plurality of side wall elements connected together at spaced intervals by a plurality of partition walls such that spaces between neighbouring pairs of partition walls define, together with the side walls, individual compartments of the gabion. The partition walls are connected to one another by pivotal connections.

A block for making retaining walls with a curved surface is known from the Japanese application description JP 200220165 A. Each block contains overlapping tongues at one or both ends of the block. The tongues have at least one curved surface.

The solutions known from the state of the art are based on newly produced elements made of concrete, steel, wood, synthetics or polystyrene. In known solutions of blocks, gabions, or nets and geogrids, recycled materials are not used or are used to a limited extent. Concrete, stone or steel-reinforced blocks have a relatively high weight by volume, which makes it difficult to build earth structures, retaining structures or road bases, especially in the case of weak subsoil.

BRIEF SUMMARY OF THE INVENTION

A block for geotechnical applications, according to the invention, is characterised by the fact that it comprises a composite body which is a section of a used wind turbine blade comprising a part of its leading edge, trailing edge and the windward and leeward surfaces of this used blade, with the body being open from above and below, and fragments of the windward surface, leeward surface, leading edge and trailing edge of the used blade are its side walls, and in addition, the inside of the body is filled with a filling material.

Preferably, the body of the block contains a fragment of at least one spar web of the used blade, connecting fragments of the windward and leeward surfaces.

Further advantages are obtained if the body of the block is cut out from a part of the used blade between its root and tip in two parallel cutting planes.

Further advantages are obtained if the cutting planes, in which the block body is cut from a used wind turbine blade, are perpendicular to the longitudinal axis of the blade.

Other advantages are obtained if the cutting planes, in which the block body is cut from a used wind turbine blade, are diagonal to the longitudinal axis of the blade.

Another advantages are obtained if the block filling material is non-cohesive and coarse-grained and has a high internal friction angle.

A method of making a block for geotechnical applications, according to the invention, is characterized by the fact that firstly, a section is marked on a used wind turbine blade, between its tip and root for mounting in a hub, then within this section, the block body is cut out, in two cutting planes parallel to each other, in the form of a fragment with a closed cross section, containing a part of a leading edge, trailing edge, windward shell and leeward shell of this blade, then this body is filled with a filling material, making its filling.

Preferably, the filling of the body is carried out on the site of constructing the structure for which the block is used.

Further advantages are obtained if aggregate is used as a filling material.

Other advantages are obtained if when cutting out a used blade, the cutting plane is orientated perpendicularly or diagonally to the longitudinal axis of the used blade.

A method of constructing a structure with the use of the block for geotechnical applications, according to the invention, is characterized by the fact that firstly, at least one layer of blocks is laid on a stabilized ground, and after laying all the blocks the whole is covered with a top layer, where each time for laying a layer of blocks, the block bodies of equal height are laid first, and then the interiors of the bodies are filled with a filling material, performing the filling of the block, while the free spaces between the bodies are also filled with the filling material.

Preferably the top layer is made using a firm soil.

Further advantages are obtained if at least two layers of blocks are laid.

Other advantages are obtained if geosynthetic reinforcement is made between the layers of the blocks.

Further advantages are obtained if each subsequent layer of the blocks is laid with an offset Δ inside the soil massif against the previously laid layer of the blocks.

Other advantages are obtained if a structure is constructed with a facing in the form of external blocks of a given layer, with the bodies of these external blocks filled with coarse-grained stone aggregate.

Another advantages are obtained if, after the bodies have been laid and before filling them with the filling material, the bodies are connected with each other by mechanical connectors.

The application of solutions according to the invention allows the use of recycled materials—used blades of wind turbines. The main structural elements of the invention are made of fibrous or layered FRP composites, with very high strength and durability, for geotechnical applications, and at the same time it does not generate high costs thanks to the use of recycled materials. The shape and large dimensions of the block—the profile of the wind turbine blade—enable their individual arrangement in both surface and spatial structures.

The blocks have a lower weight by area or by volume compared to concrete blocks or metal gabions, which is crucial in geotechnical applications, especially in the case of weak subsoil.

In the solution, there is a synergy of very good material features of the composite with favourable geometry of the block's profile, which results in high stiffness and load-bearing capacity of a single block and the whole structure where it is used, which in turn allows for more effective design of earth structures or ground reinforcement.

Due to the possibility of almost unrestricted cutting of a structural element from a used wind turbine blade in planes parallel to each other and perpendicular or diagonal to the longitudinal axis of the blade, it is possible to obtain blocks of equal length—the distance between the cutting planes—in order to obtain system solutions with fixed block heights. This makes it easier to incorporate the blocks into a selected geotechnical structure later on. Thanks to the variable cross-sectional shapes of the blade profiles, there are many possibilities to create surface and spatial systems from the blocks, which allows to adjust to a specific terrain situation and technical problem that this construction is to solve.

The short-term tensile strength of composite walls of the block is between 70 MPa and 500 MPa, depending on place and direction. The short-term compression strength is in the range from 100 MPa to 400 MPa and the shear strength is in the range from 30 MPa to 50 MPa. The lower limits of these strength values refer to layered laminates, while the upper limits refer to solid laminates. These are the strength levels similar to or significantly higher than those of conventional materials reinforcing steel, concrete, wood, synthetics—when applied to similar structural elements.

The blocks according to the invention are made of a composite material with much higher resistance to the corrosive environment occurring in the ground, as compared to blocks made of steel or concrete or to gabions made of steel mesh wires, what significantly increases the durability of the earth structure, retaining structure or ground reinforcement, made of blocks according to the invention.

A relatively low weight of blocks by volume compared to structures made of concrete, stone or reinforced with steel significantly accelerates the construction of buildings, structures or the execution of ground reinforcements. The weight by volume of the block material according to the invention is about 18 kN/m$^3$ for solid laminates and about 10 kN/m$^3$ for layered laminates and the weight by volume of conventional materials is 24 kN/m$^3$ for concrete and 77.5 kN/m$^3$ for steel.

BRIEF DESCRIPTION OF THE SEVERAL VIEWS OF THE DRAWINGS

Further advantages features and details of the various embodiments of this disclosure will become apparent from the ensuing description of a preferred exemplary embodiment or embodiments and further with the aid of the drawings. The features and combinations of features recited below in the description, as well as the features and feature combination shown after that in the drawing description or in the drawings alone, may be used not only in the particular combination recited but also in other combinations on their own without departing from the scope of the disclosure.

In the following, advantageous examples of the invention are set out with reference to the accompanying drawings, wherein.

DETAILED DESCRIPTION OF THE INVENTION

As used throughout the present disclosure, unless specifically stated otherwise, the term "or" encompasses all possible combinations, except where infeasible. For example, the expression "A or B" shall mean A alone, B alone, or A and B together. If it is stated that a component includes "A, B, or C", then, unless specifically stated otherwise or infeasible, the component may include A, or B, or C, or A and B, or A and C, or B and C, or A and B and C. Expressions such as "at least one of" do not necessarily modify an entirety of the following list and do not necessarily modify each member of the list, such that "at least one of "A, B, and C" should be understood as including only one of A, only one of B, only one of C, or any combination of A, B, and C.

Figure 1:
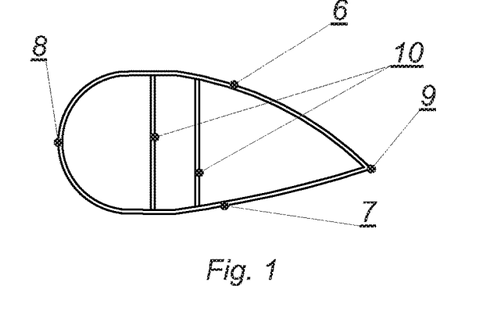
FIG. 1 depicts a block body in a top view.
Figure 2:
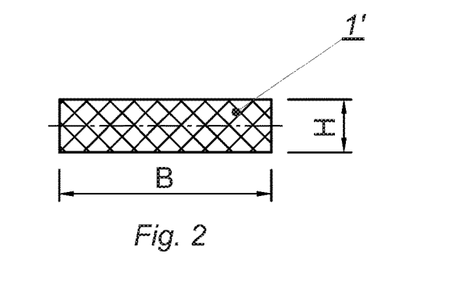
FIG. 2 depicts a block in a side view.
Figure 3:
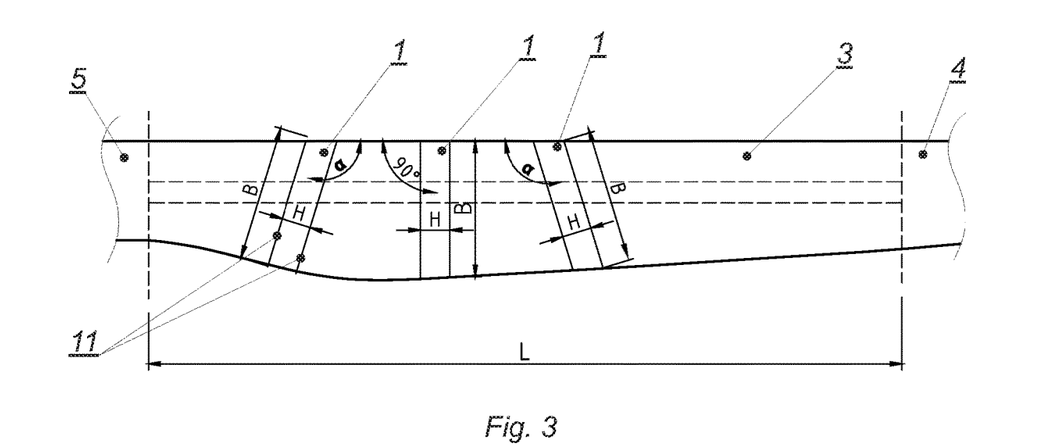
FIG. 3 depicts graphically cutting out a block body from a used wind turbine blade.

In the first embodiment, the block for geotechnical applications comprises a composite body 1 and its filling 2. The composite body 1 contains side walls and is open from above and below. The body 1 is a section of a used wind turbine blade 3 made of solid composite and is cut out from a part of this blade 3 between its tip 4 and the root 5, for fixing in the hub, so that the section has a closed cross section. The side walls of the section are made up of curvilinear solid laminates, which are a part of a windward shell 6, leeward shell 7, leading edge 8 and trailing edge 9 of the blade 3. In addition, this section of the blade 3, which is the body 1 of the block 1', comprises a part of longitudinal spar webs 10 of the blade 3, with which its windward sheath 6 is connected with the leeward sheath 7. The composite body 1 has its filling 2 made with natural soil. The section of the blade 3 is cut out of it in two cutting planes 11, parallel to each other, at a cutting angle α perpendicular to the longitudinal axis of the blade 3.

In the second embodiment, the block for geotechnical applications comprises a body 1 being a section of a used blade 3 of a wind turbine made of layered laminate, cut out in two parallel planes of the section 11, at a cutting angle α diagonal to the longitudinal axis of the blade 3. The filling 2 of the block 1' is made of natural mineral aggregate. In the remainder of the embodiment, it is as in the first embodiment.

In the third embodiment, the block for geotechnical applications comprises a filling 2 made of artificial aggregate. In the remainder of the embodiment, it is as in the first embodiment.

In the fourth embodiment, the block for geotechnical applications comprises a filling 2 made of construction debris. In the remainder of the embodiment, it is as in the first embodiment.

In the fifth embodiment, the block for geotechnical applications comprises a filling 2 made of coarse stone aggregate. In the remainder of the embodiment, it is as in the first embodiment.

In the first embodiment, the method of making the block for geotechnical applications consists in using a used wind turbine blade 3 made of solid composite containing two longitudinal spar webs 10, connecting its windward shell 6 with its leeward shell 7, reinforcing its structure. First of all, a segment L between the tip 4 and the root 5 (for mounting in a hub) is marked on the used blade 3. Within the segment L, a section of the blade 3 is cut out in two cutting planes 11, parallel to each other and oriented at a cutting angle α perpendicular to the longitudinal axis of the blade 3. The section of the blade 3 obtained in this way has a closed cross-section and contains a part of the leading edge 8, trailing edge 9, windward shell 6, and leeward shell 7, as well as a part of the spar webs 10 connecting these shells 6 and 7 and forming the body 1 of the block 1'. The distance between the cutting planes 11 determines the height H of the block P. The width B of the block 1' depends on the location of the segment L of the blade 3 and the cutting angle α. Then the interior of the body 1' obtained in this way is filled with filling material. Natural soil is used as a filling material. Filling with the filling material is carried out at the place of construction of a given structure for which the blocks 1' are used.

In the second embodiment, the method of making the prefabricated block for geotechnical applications consists in using a used wind turbine blade 3 made of layered composite containing two longitudinal spar webs 10, connecting its windward shell 6 with its leeward shell 7, reinforcing its structure. The section of the blade 3 on its segment L is cut out in two parallel cutting planes 11 oriented at a cutting angle α diagonal to the longitudinal axis of the blade 3. The interior of the body 1 thus obtained is filled with mineral natural aggregate. In the remainder of this method, it consists in the same as the first method.

Figure 4:
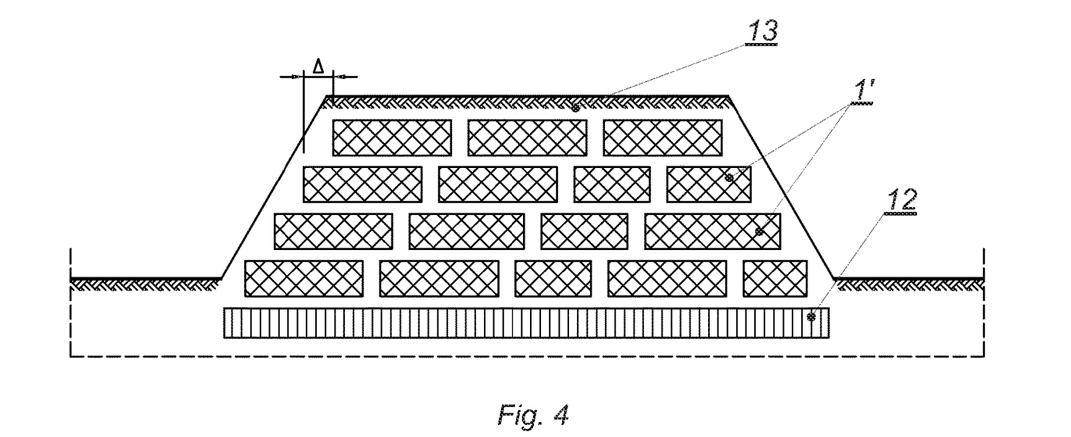
FIGS. 4 to 8 depicts graphically a way of constructing structures with the use of blocks, respectively for a river embankment, retaining wall, retaining wall with additional reinforcement with geosynthetics, road base, and railway track bed.
Figures 5, 6:
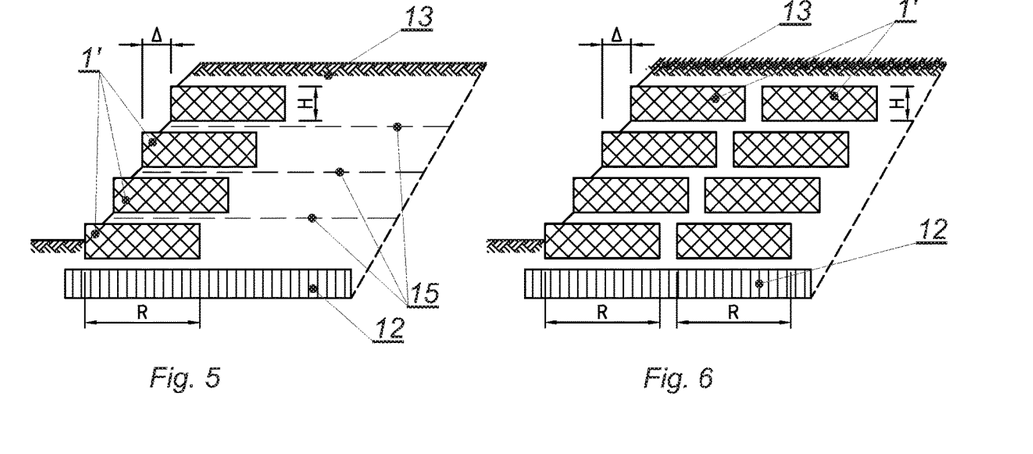
Figure 9:
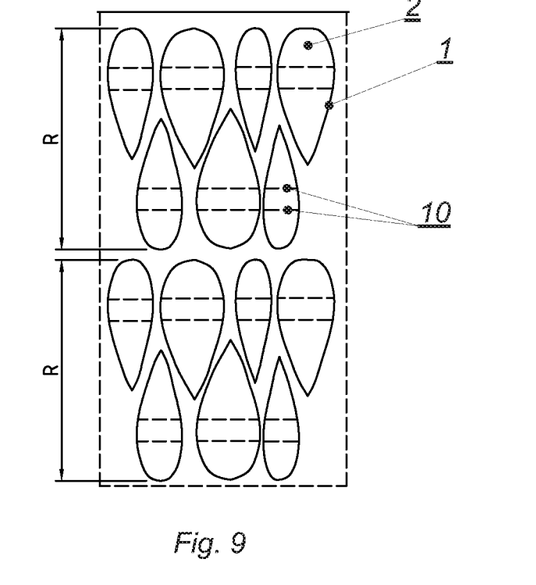
FIGS. 9 to 13 depict a layer of blocks in a top view laid respectively in equal rows alternately, perpendicularly to each other, longitudinally, curvilinearly, transversely to the axis of a row.
Figure 10:
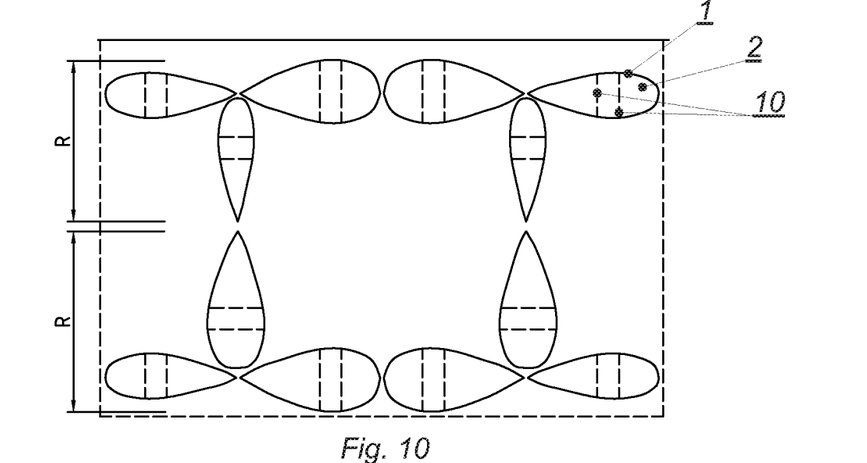

In the first example of implementation, the method of constructing structures with the use of blocks for geotechnical applications according to the invention consists in using the blocks 1' described in the second and third embodiment. An earth structure in the form of a river embankment is constructed. Firstly, the first layer of the blocks 1' is laid on stabilised ground 12, then the second layer of the blocks 1' is laid on it and then the third and fourth layer of the blocks 1' respectively. After laying the last layer of the blocks 1', the whole is covered with a top layer 13. To make the first layer of the blocks 1 bodies 1 made of sections of a used composite blade 3 of a wind turbine, of equal height H and various widths B are laid on the stabilised ground 12. The bodies 1 are laid in rows R. Within a given row R, the bodies 1 are arranged alternately, with their parts containing a fragment of the trailing edge 9 of the wind turbine blade 3 facing each other, thus filling the free spaces between individual bodies 1 in the area of their narrowing from the side containing the trailing edge 9 the used blade 3. Then the interiors of the bodies 1 and the free spaces between the bodies 1 are filled with a filling material in the form of artificial aggregate and mineral aggregate. The filling material is thickened, and then the second layer of the blocks 1' is laid. The bodies 1 of the blocks 1' of the second layer are laid with an offset Δ inside the soil massif. In the remainder, the laying of the second layer of the blocks 1' is carried out as for the first layer. Then the third layer is laid like the second layer, and after it is laid, the fourth layer is laid like the second layer, and after it is laid, the entire structure is covered with the top layer 13 made using a firm soil.

In the second example of implementation, the method of constructing structures with the use of blocks for geotechnical applications according to the invention consists in using the blocks 1' described in the second and fifth embodiment. The structure constructed is a retaining structure. Firstly, the first layer of the blocks 1' is laid on stabilised ground 12, then the second layer of the blocks 1' is laid on it and then the third and fourth layer of the blocks 1' respectively. After laying the last layer of the blocks 1', the whole is covered with a top layer 13. To make the first layer of the blocks 1', bodies 1 made of sections of a used composite blade 3 of a wind turbine, of equal height H and various widths B are laid on the stabilised ground 12. The bodies 1 are laid in two rows R, with their parts containing a fragment of the trailing edge 9 of the wind turbine blade 3 facing each other. After laying the bodies 1 of a given layer, they are connected by means of mechanical connectors 14 in the form of composite rods with a hook. Rods with a length equal to twice the height H of the block 1' are used. Then these bodies 1 and the free spaces between them are filled with the filling material, in the form of aggregate, with the bodies 1 of the outer blocks 1', which form the structure's facing, and the free spaces between them are filled with coarse aggregate, and the remaining bodies 1 and the free spaces between them are filled with fine aggregate. The filling material is thickened, and then the second layer of the blocks 1' is laid with an offset Δ inside the soil massif against the previously laid layer. In the remainder, the laying of the second layer of the blocks 1' is carried out as for the first layer. After laying the second layer of blocks the third and fourth layers are laid like the second layer. When the fourth layer of the blocks 1' is laid, the entire structure is covered with the top layer 13 made using a firm soil. In the remainder, the works are carried out as in the method of constructing structures with the use of blocks for geotechnical applications in the first example of implementation.

In the third example of implementation, the method of constructing structures with the use of blocks for geotechnical applications according to the invention consists in using the blocks 1' described in the second embodiment. The structure constructed is a retaining structure. Firstly, the first layer of the blocks 1' is laid on stabilised ground 12, then the second layer, third and fourth layer of the blocks 1' is laid, after laying them, the whole is covered with a top layer 13. To make the first layer of the blocks 1', bodies 1 made of sections of a used composite blade 3 of a wind turbine, of equal height H, are laid on the stabilised ground 12. The bodies 1 are laid in one row R, with their parts containing a fragment of the trailing edge 9 of the wind turbine blade 3 facing the inside of the structure. After laying the bodies 1 of a given layer, they are connected by means of mechanical connectors 14 in the form of steel rods with a hook having a length of not less than twice the height of the block P. Then the bodies 1 and the free spaces between them are filled with a filling material in the form of mineral aggregate. The filling material is thickened. After laying the first layer of the blocks 1', the soil is additionally reinforced by placing a geosynthetic material 15 in the form of a geonet. The bodies 1 of the blocks 1' of the second layer are laid with an offset Δ inside the soil massif. In the remainder, the second layer of the blocks 1' is laid in the same way as the first layer, and after it has been laid, an additional reinforcement is also provided by placing the geosynthetic material 15 in the form of a geonet. After the second layer of blocks 1' is laid, the third and the fourth layers are laid just like the second layer. An additional reinforcement is made between the third and the fourth layer of blocks 1' by placing the geosynthetic material 15 in the form of a geonet. After the fourth layer of the blocks 1' is laid, the entire structure is covered with a top layer using a film soil. In the remainder, the works are carried out as in the method of constructing structures with the use of blocks for geotechnical applications in the second example of implementation.

Figure 7:
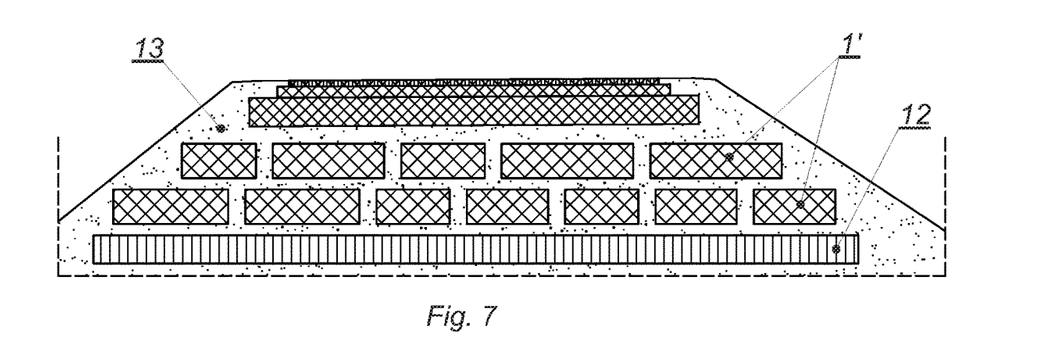
Figure 13:
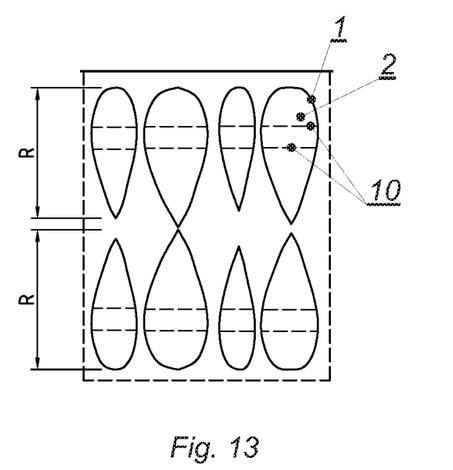
Figure 14:
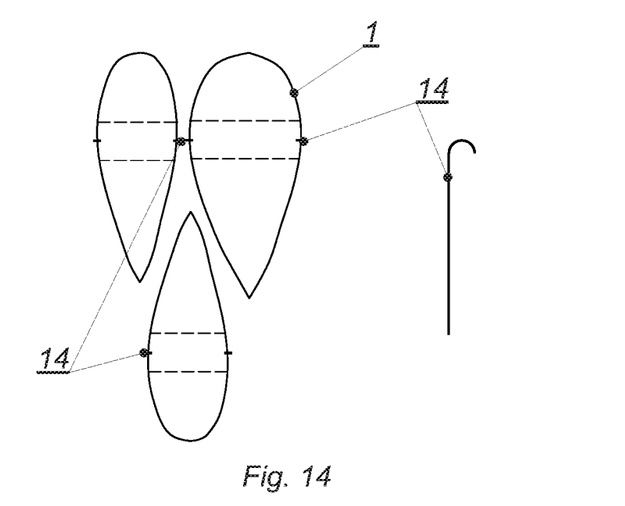
FIGS. 14 to 16 depict mechanical connections between laid blocks.
Figure 15:
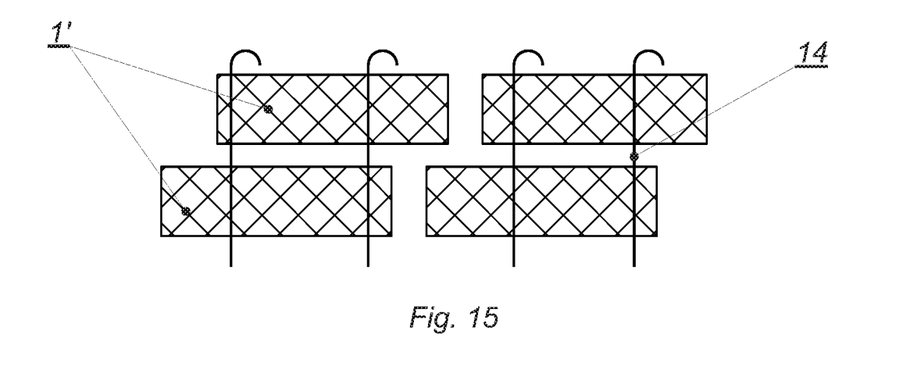
Figure 16:
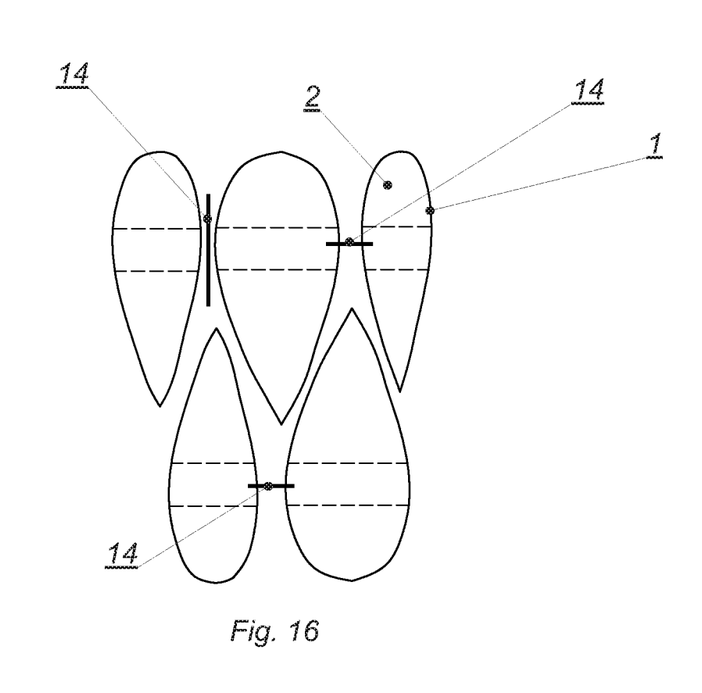

In the fourth example of implementation, the method of constructing structures with the use of blocks for geotechnical applications according to the invention consists in using the blocks 1' described in the first and the second embodiment. The blocks 1' are used to reinforce the ground which forms a road base course. Firstly, the first layer of the blocks 1' is laid on stabilised ground 12, then the second layer of the blocks 1' is laid on it and finally the whole is covered with a top layer 13 of a firm soil. To make the first layer of the blocks 1', bodies 1 made of sections of a used composite blade 3 of a wind turbine, of equal height H, To make the first layer of the blocks 1', bodies 1 made of sections of a used composite blade 3 of a wind turbine, of equal height H, are laid on the stabilised ground 12. The bodies 1 are laid in rows R crosswise to the axis of a given row R. After laying the bodies 1 of the first layer, they are connected with each other by mechanical connectors 14 in the form of synthetic tapes. Then the second layer of the blocks 1' is laid. The bodies 1 of the second layer of the blocks 1' are laid on the first layer with an offset Δ inside the soil massif. In the remainder, the laying of the second layer of the blocks 1' is carried out as for the first layer. After laying the second layer of blocks 1', the entire structure is covered with a top layer using a firm soil. In the remainder, the works are carried out as in the method of constructing structures with the use of blocks for geotechnical applications in the first example of implementation.

Figure 8:
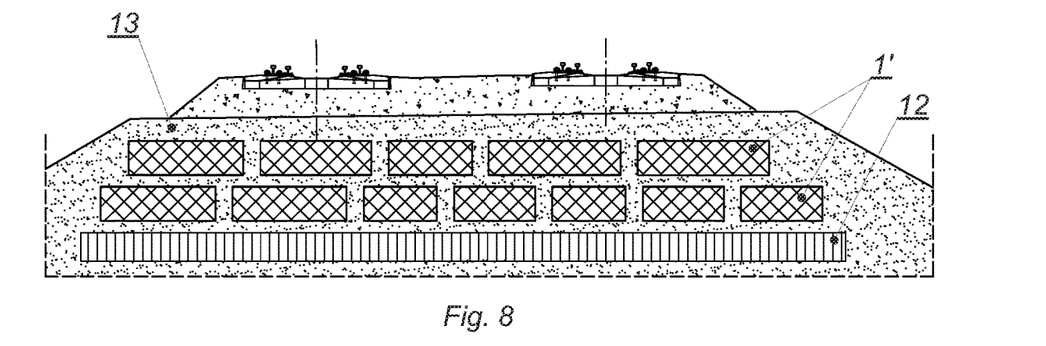
Figure 11:
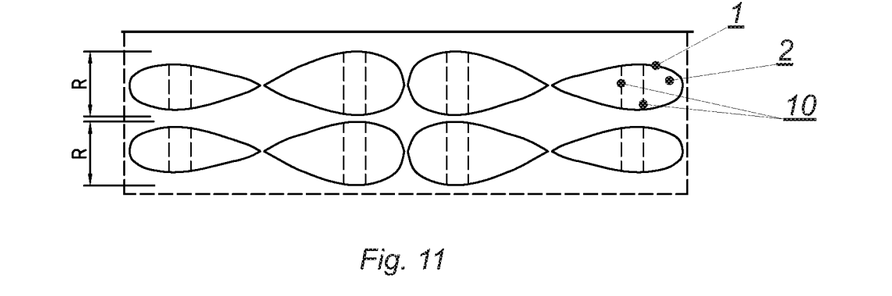
Figure 12:
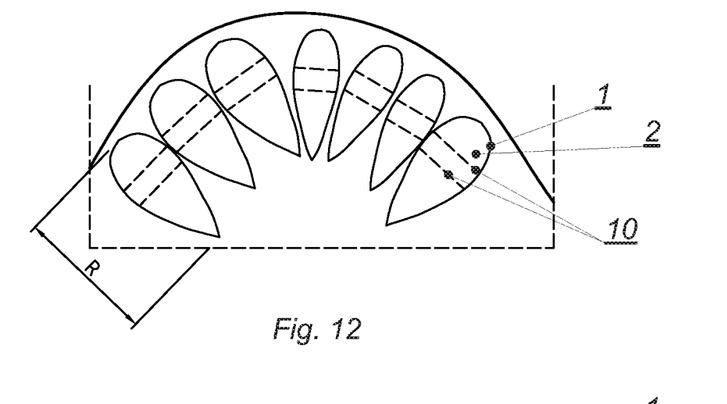

In the fourth example of implementation, the method of constructing structures with the use of blocks for geotechnical applications according to the invention consists in using the blocks 1' described in the fourth and the fifth embodiment. The blocks 1' are used to reinforce the ground which forms a railway track bed. The bodies 1 are arranged in rows R, with their longitudinal axis along the axis of the row R. The interiors of the bodies 1 are filled with construction debris and coarse mineral aggregate. The bodies 1 of the blocks 1' within a given layer are connected with each other by means of mechanical connectors 14 in the form of bolts. In the remainder, the works are carried out as in the method of constructing structures with the use of blocks for geotechnical applications in the third example of implementation.

The invention claimed is:
1. A block for geotechnical applications, comprising:
   a composite body including a section of a used wind turbine blade comprising a part of the used wind turbine blade leading edge, trailing edge and a windward surface and leeward surface,
   wherein the body is configured to be open from above and below, and fragments of the windward surface, leeward surface, leading edge and trailing edge of the used blade comprise body side walls, and
   wherein an inside of the body is filled with a filling material.
2. The block according to claim 1, wherein body further comprises a fragment of at least one spar web of the used blade connecting fragments of the windward surface and leeward surface.
3. The block according to claim 1, wherein the body is cut out from a part of the used blade between the blade root and tip in two parallel cutting planes.
4. The block according to claim 3, wherein the cutting planes, in which the body is cut from a used wind turbine blade, are arranged perpendicular to the longitudinal axis of the blade.
5. The block according to claim 3, wherein the cutting planes, in which the body is cut from a used wind turbine blade, are arranged diagonal to the longitudinal axis of the blade.
6. The block according to claim 1, wherein the filling material is non-cohesive and coarse-grained and has a high internal friction angle.

* * * * *